Figure 1:
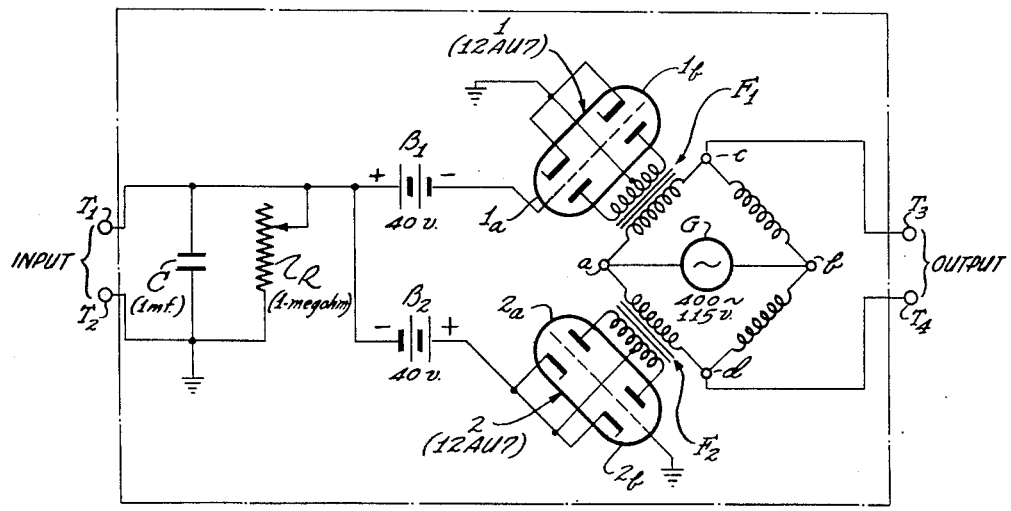

Jan. 27, 1953

J. RADIGAN 2,627,061

POWER CONTROL BRIDGE

Filed Nov. 13, 1951

INVENTOR:
Joseph Radigan
By Herbert E. Metcalf
His Patent Attorney

Patented Jan. 27, 1953

2,627,061

UNITED STATES PATENT OFFICE 2,627,061

POWER CONTROL BRIDGE

Joseph Radigan, Los Angeles, Calif., assignor to Northrop Aircraft, Inc., Hawthorne, Calif., a corporation of California Application November 13, 1951, Serial No. 255,977

8 Claims. (Cl. 323—75)

1

The present invention relates generally to bridge circuits, and more particularly to a new and novel power control bridge circuit.

It is frequently desired and sometimes necessary to control large A. C. drive motors, or the like, by means of a relatively small D. C. signal voltage. This can usually be done effectively and most efficiently by employing the D. C. signal for control of the A. C. power to the A. C. drive motors or load. It is, therefore, desirable to provide means which are capable of control of both magnitude and direction (phase) of A. C. power to various types of A. C. loads.

It is accordingly an object of this invention to provide means whereby the direction and magnitude of A. C. power to drive motors, or the like, can be controlled by a D. C. signal voltage.

Briefly, the foregoing object and other objects ancillary thereto are preferably accomplished by providing two transformers each having double primaries which are arranged in the form of a bridge. The two primaries of each transformer are connected as opposite pairs of arms in the bridge, and the secondaries of the two transformers are each connected to the plates of two dual-triodes, for example, which are controlled by a D. C. signal voltage applied to the grids of one dual-triode and the cathodes of the other, such that when one dual-triode is made more conducting, the opposite effect is produced in the other. A. C. power is provided across the center of the bridge and output to the load is taken from across the ends of the bridge. Thus, when one dual-triode can conduct much greater than the other, the primaries of that particular transformer "see" a greatly reduced impedance while the impedance of the other two arms (of the second transformer) is substantially higher. This condition of unbalance permits a proportional current to flow through the drive motors or load. If a formerly greater conducting tube is biased towards cut-off, and the other is allowed to conduct more than the first, the condition of impedance unbalance is reversed and it will be clear that the direction of current through the load is also caused to reverse by an 180° phase change. By varying the magnitude of the D. C. input signal voltage either positively or negatively, the two dual-triodes and associated transformers can serve to regulate both the direction (phase) and magnitude of A. C. load current according to the increase or decrease of D. C. signal.

The invention possesses other objects and

2 features, some of which, together with the foregoing, will be set forth in the following description of a preferred embodiment of the invention, and the invention will be more fully understood by reference to the accompanying drawings, in which:

Figure 1 shows, as an example only of this invention, a schematic circuit diagram illustrating the connections and components used for optimum performance with a 400 C. P. S. power supply and load.

Figure 2:
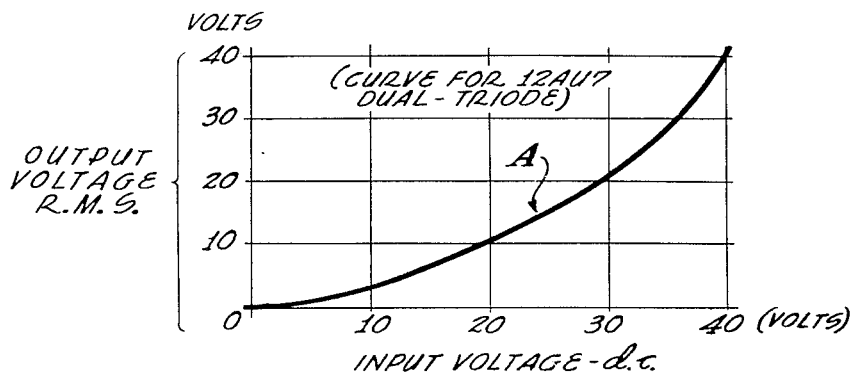

Figure 2 is a graph showing output voltage of the bridge plotted against input voltage.

Referring to Figure 1, assume for example that the D. C. output of a phase detector (not shown) is applied at input terminals T1 and T2, and has a maximum voltage of plus and minus 40 volts. It is herewith noted that since the magnitude of output of a phase detector increases with difference of phase either positively or negatively according to lead or lag of phase, in the range of 0 to 180°, with regard to a reference signal, the control bridge used in combination with a phase detector can obviously regulate A. C. load currents in accordance with phase variation. The input signal to the control bridge is first filtered by a parallel condenser C and resistor R. This filtered signal is then divided and applied to the grids of one dual-triode 1 and to the cathodes of another dual-triode 2 through bias batteries B1 and B2 differently oriented in polarity to regulate conduction of the tubes.

The negative terminal of bias battery B1 is connected to both grids of the dual-triode 1, and the two cathodes of the triode sections 1a and 1b are connected together to ground. In a similar manner, the positive terminal of bias battery B2 is connected to both cathodes of the dual-triode 2, and the two grids of the triode sections 2a and 2b are connected together to ground.

The two plates of tube 1 are connected together through the center tapped secondary winding of transformer F1, and the two plates of tube 2 are connected together through the center tapped secondary winding of transformer F2. The center tap of each secondary is connected to the cathodes of the associated tube. Windings a—d and c—b are the two primaries of transformer F2 arranged as opposite arms of a bridge wherein the remaining two opposite arms are provided from windings a—c and d—b, the primaries of transformer F1. An A. C. power supply G connected between winding ends a and b provides power, the output of which is taken from across winding ends c and d to an A. C. load connected to output terminals T3 and T4.

For the preferred circuit hereinbefore shown and described, suitable values of C and R, for example, are 1 mf. capacity and 1 megohm resistance, respectively. Batteries B1 and B2 each provide a 40 volt bias for the respective dual-triodes and power supply G can be a 400 C. P. S., 115 v. source. The bias of 40 volts is preferably selected to put both tubes 1 and 2 at cut-off when there is no D. C. input signal. The connection from the center-tapped secondary to the cathodes, of each tube, provides a return path for plate current when the A. C. voltage from the power supply G is applied to the plates through the transformers, and the dual-triodes as connected in this embodiment provide full-wave operation. The turn ratio N1/N2 of both transformers F1 and F2 is 1/7 in this particular case, wherein N1 is the number of turns for a primary winding such as $a$—$d$, and N2 is half the number of turns of an entire center tapped secondary winding.

Each of transformers F1 and F2 above is a closely coupled iron-core transformer, in which case the primary impedance Z1 that can be measured between primary terminals of the individual primary winding can be considered with good approximation to be equal to one fourth the square of the turn ratio times the secondary impedance Z2 connected across the entire secondary winding, or symbolically, $$Z1 = 1/4(N1/N2)^2 Z2 = K\ Z2$$

where K is a numerical constant equal to 1/4 $(N1/N2)^2$. The magnitude of impedance Z2 is dependent upon the instantaneous conducting ability of the triode sections since changing the bias for each dual-triode can vary the secondary current proportionally. That is, the tubes act effectively as a variable impedance and this is transformed in the primary as Z1. Thus, increasing the input D. C. signal in a positive direction decreases the grid bias of tube 1, permits greater conduction of this tube 1, thereby presenting a lower primary impedance reflected in both ridge arm primaries $a$—$c$ and $d$—$b$, and at the same time increases the grid bias of tube 2, either reducing its conduction or sending it further beyond cut-off, thereby presenting an increased or maximum primary impedance reflected in the primaries $a$—$d$ and $c$—$b$ comprising the remaining two arms of the bridge. As a result, bridge is unbalanced and A. C. output current flows through the load connected across T3 and T4 according to the amount of unbalance. Impedance unbalance is reduced when decreasing the D. C. signal from the above mentioned increased condition, and a 180° phase shift of output current is effected by reversing the polarity of the D. C. input signal.

Referring to Figure 2, there is shown, for example, a curve A of the output voltage appearing across terminals T3 and T4 plotted against the D. C. input voltage from 0 to +40 volts applied across terminals T1 and T2. Calibration curve A for 12AU7 dual-triodes is non-linear as shown.

The input D. C. signal can be of very low power as, for example, produced from the phase detector.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. Means for the control of A. C. power by a D. C. signal, comprising two transformers each having a single secondary and double primaries, a bridge circuit having the two primaries of one of said transformers as two opposite arms thereof and the two primaries of the other of said transformers as the remaining two opposite arms thereof, a source of A. C. supply connected across the centers of said bridge, output connections for a load to be controllably supplied connected across the ends of said bridge, a separate variable impedance connected to each transformer secondary, two input connections adapted to be connected to said D. C. signal, and impedance control means connected between said input connections and each of said variable impedances, said impedance control means being adapted to produce relative decrease of one of said variable impedances with respect to the other in proportion to a change of said D. C. signal in the positive direction, and to produce relative decrease of said other variable impedance with respect to the first in proportion to a D. C. signal change in the negative direction, whereby said bridge is unbalanced in either of two directions to produce a proportional change in magnitude and/or phase of alternating current flowing through said load.

2. Apparatus in accordance with claim 1 wherein said bridge is balanced at zero D. C. signal across said input connections, to produce equal potentials at said output connections.

3. Apparatus in accordance with claim 1 wherein a filter network is connected to said input connections to filter out spurious fluctuations from said D. C. input signal.

4. Means for the control of A. C. power by a D. C. signal, comprising a first and a second transformer each having a single secondary and double primaries, a bridge circuit having the two primaries of said first transformer as two opposite arms thereof and the two primaries of said second transformer as the remaining two opposite arms thereof, a source of A. C. supply connected across the centers of said bridge, output connections for a load to be controllably supplied connected across the ends of said bridge, a first and second electronic control tube each having a cathode, control grid and plate, the secondary of said first transformer connected in the plate circuit of said first control tube and the secondary of said second transformer connected in the plate circuit of said second control tube, the transformed A. C. from said A. C. supply being the sole source of plate voltage for said control tubes, two input connections adapted to be connected to said D. C. signal, means connecting one of said input connections to the control grid of said first control tube and to the cathode of said second control tube, and means biasing each of said control grids to a predetermined lower potential than each of their respective cathodes when no D. C. signal is present at said input connections, whereby a change in amplitude of said D. C. signal causes a change in plate current of one of said tubes which reflects an impedance change in two opposite arms of said bridge to produce a change in alternating current flow through said load proportioned to said D. C. signal change.

5. Apparatus in accordance with claim 4 wherein said no-signal bias potential has a value which, in combination with said plate voltage, places each of said control tubes substantially at cut-off.

6. Apparatus in accordance with claim 4 wherein each of said transformer secondaries is center-tapped, and wherein said first and second control tubes comprise first a second dual triode, respectively, the complete secondary of said first transformer being connected between the two plates of said first dual-triode, the complete secondary of said second transformer connected between the two plates of said second dual-triode, the center tap of said first transformer secondary and the two cathodes of said first dual-triode directly connected together, and the center tap of said second transformer secondary and the two cathodes of said second dual-triode directly connected together.

7. Power control bridge means for the control of A. C. power by a D. C. signal, comprising two input connections for said D. C. signal, a first and a second bias source, one of said input connections connected to the positive side of said first bias source and to the negative side of said second bias source, a first and a second dual-triode electronic tube, the negative side of said first bias source connected to both control grids of said first dual-triode, both cathodes of said first dual-triode connected to the other one of said input connections, the positive side of said second bias source connected to both cathodes of said second dual-triode, both control grids of said second dual-triode connected to said other input connection, a first and a second transformer each having a center-tapped secondary and double primaries, said first transformer secondary connected between the two plates of said first dual-triode, said second transformer secondary connected between the two plates of said second dual-triode, the center tap of each of said transformer secondaries connected to the cathodes of its associated dual-triode, the two primaries of said first transformer arranged to form two opposite arms of an electrical bridge and the two primaries of said second transformer arranged and connected to form the remaining two opposite arms of said bridge, a source of A. C. power connected across the center of said bridge, and output connections connected across the ends of said bridge.

8. Apparatus in accordance with claim 7 wherein a filter network is connected to said input connections, said filter network comprising a parallel capacitance and resistance combination to filter out fluctuations from said D. C. input signal.

JOSEPH RADIGAN.

No references cited.